United States Patent [19]

Nishiyama et al.

[11] Patent Number: 4,834,036

[45] Date of Patent: May 30, 1989

[54] COMPOSITE VALVE FOR RECIPROCATING ENGINES AND METHOD FOR MANUFACTURING THE SAME

[75] Inventors: Yukio Nishiyama; Junzo Fujioka, both of Akashi; Haruki Hino; Takuya Miyashita, both of Kobe, all of Japan

[73] Assignee: Kawasaki Jukogyo Kabushiki Kaisha, Kobe, Japan

[21] Appl. No.: 203,494

[22] Filed: Jun. 7, 1988

[30] Foreign Application Priority Data

Jun. 25, 1987 [JP] Japan .............................. 62-97534[U]

[51] Int. Cl.⁴ ................................................ F01L 3/00
[52] U.S. Cl. ......................... 123/188 A; 123/188 AA; 251/358
[58] Field of Search .................. 123/188 AA; 251/358

[56] References Cited

U.S. PATENT DOCUMENTS

| | | | |
|---|---|---|---|
| 1,826,542 | 10/1931 | Henig | 123/188 AA |
| 2,037,340 | 4/1936 | Rich | 123/188 AA |
| 2,394,177 | 2/1946 | Hoern | 123/188 AA |
| 2,882,886 | 4/1959 | Butcher et al. | 123/188 AA |
| 3,073,294 | 1/1963 | Brown et al. | 123/188 AA |
| 4,433,652 | 2/1984 | Holtzberg et al. | 123/188 AA |
| 4,729,546 | 3/1988 | Allison | 123/188 AA |

Primary Examiner—E. Rollins Cross

[57] ABSTRACT

A composite follow valve for internal combustion engines such as an intake and an exhaust valve and the method for producing the same are disclosed. The valve is produced by integrating into the whole a valve head portion molded from a lightweight, heat-resistant material selected from a group of titanium alloys and titanium-aluminium alloys, a stem portion molded from a high-strength alloy steel, made hollow inside to reduce weight, and a stem end portion molded from a hard material selected from a group of martensitic stainless steel, silicon nitride and silicon carbide ceramics. Since the different materials of the separate valve components are selected to meet the requirements of their particular functions and operating condition under which they are placed. Also, because of this separate arrangement, the valve can be produced at a relatively reduced cost, since the use of expensive materials is saved. Furthermore, the valve is molded, not in a whole body, but in separate components, there is no use for expensive isothermal forging machines as in the case of prior art production methods.

8 Claims, 2 Drawing Sheets

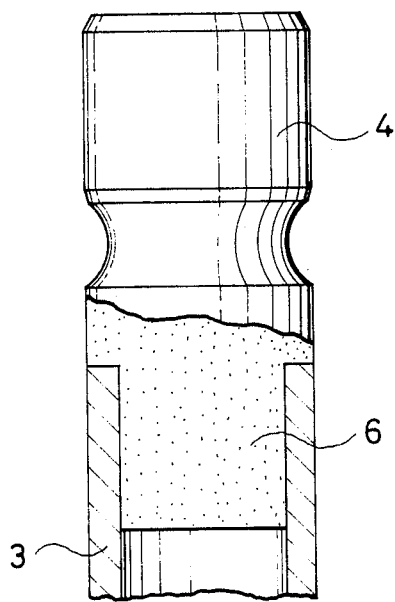
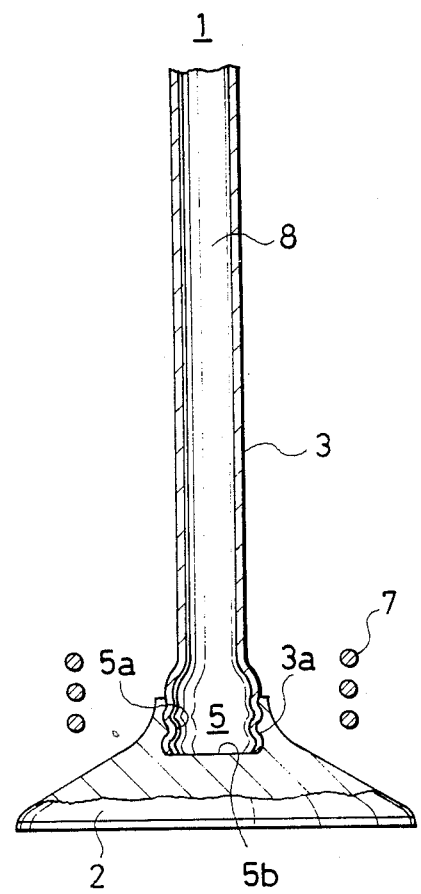

COMPOSITE VALVE FOR RECIPROCATING ENGINES AND METHOD FOR MANUFACTURING THE SAME

BACKGROUND OF THE INVENTION (1) Field of the Invention

The present invention relates to a composite hollow valve for reciprocating engines such as an intake or exhaust valve. This invention also relates to a method for manufacturing the same.

(2) Description of the Prior Art

An internal combustion engine is required to have its intake and exhaust valves made lightweight to enhance responsibility and performance at low speed ranges. Various development have so far been proposed along this line. One such an example is disclosed in published Japanese patent application 61-229 907 by the same applicant as this invention, which teaches valve drive system parts including titanium aluminides intake and exhaust valves. This prior art relies upon the excellent properties of titanium-aluminides such as a low specific gravity equivalent to 48 to 61% of that of steel and oxidation resistance at high temperatures.

Production of a titanium aluminides engine valve such as an intake or exhaust valve consists in, first, providing a titanium aluminide billet as by argon arc melting, plasma arc melting, or vacuum arc melting method and then is formed into shape by precision casting, isothermal forging, extrusion, hot isostatic press, with, if desired, suitable thermal treatment and machining work depending on the type of the part being manufactured.

Different parts of an engine valve including a valve head, stem, stem end are required to have a different set of properties from one another for desired valve performance as a whole. For example, a valve head portion must be highly heat-resistant while increased mechanical strength is one of the requirements for valve stem portions. On the other hand, a valve stem end is required to have abrasive resistant properties.

Therefore, producing the whole parts of the engine valve from expensive titanium aluminides would not be said an advantageous manufacturing method in the sense of effective material use.

Furthermore, the forming of an engine valve in integrated whole by isothermal forging method presents a difficulty in the forging of a titanium aluminides, as an example, having an essential characteristics of a tough working, and, still furthermore, requires a skilled experience in a special forging technique even through the forming is available.

The present invention has been proposed to eliminate the above-mentioned drawbacks of the conventional engine valves.

It is therefore an objective of the present invention to provide a composite hollow engine valve for internal combustion engines such as an intake or exhaust valve which can be manufactured at a low cost while to a weight equal or substantially lighter than those prior art engine valves of comparable capacity and size.

It is also another object of the present invention to provide a method for producing such engine valves.

SUMMARY OF THE INVENTION

The above and other objectives, features and advantages of the present invention are achieved by integrating into a whole body the separate parts of an engine valve, manufactured from a different material from one another; the valve head portion from a lightweight, heat-resistant material such as titanium alloys and titanium aluminides, the stem portion from any known substantially high strength alloy steel, made hollow inside to reduce weight, and the stem end portion from a material with increased hardness.

Since the engine valve of the present invention is produced by integrating its separate components made from selected materials to meet their required respective required properties in operation, the overall production cost can be relatively low, without giving unwanted, hence costly properties to each valve part, compared with conventional engine valves. In addition, since the valve is fabricated, not in a whole body, but in separate components, there is no need for expensive isothermal forging machines as in the case of producing internal combustion engine valves made of titanium aluminides.

In addition, since the engine valve of the present invention has its head portion made from titanium alloys or titanium aluminides, with its stem portion being made hollow inside, the overall valve weight is likely to be smaller, or at least, no more than that of internal combustion engine valves made of titanium aluminides.

The table presented below compares the weight of an exhaust valve produced in accordance with the present invention with a typical conventional exhaust valve of comparable size and capacity, to be concrete, with a head diameter of 20 mm and a stem length of 90 mm for a 900 cc engine.

| Part Name | Material | Weight (gr.) |
| --- | --- | --- |
| Composite Hollow Exhaust Valve of the Present Invention | | |
| Head | Titanium Alumnides | 5.0 |
| Stem | Chromium-Molybdenum Steel | 9.0 |
| Stem end | Martensitic Stainless Steel | 2.0 |
| Overall weight | | 16.0 |
| Conventional One-Piece Exhaust Valve | | |
| All parts | Heat-Resisting Steel | 32.0 |

It will be apparent from the above table that the present invention can reduce overall valve weight by half.

Reduction in valve weight would also contribute to minimizing valve vibrations in engine operation.

BRIEF DESCRIPTION OF THE DRAWINGS

FIG. 3 is a cross-sectional view of the engine valve of this invention showing the joint between the stem portion and stem end portion; and FIG. 4 is a side view of a composite valve for internal combustion engines showing the manufacturing methods according to the present invention.

DETAILED DESCRIPTION OF PREFERRED EMBODIMENTS

Preferred embodiments of the composite hollow valve for internal combustion engines according to the present invention will be described in full detail in conjunction with the accompanying drawings.

Figure 1:
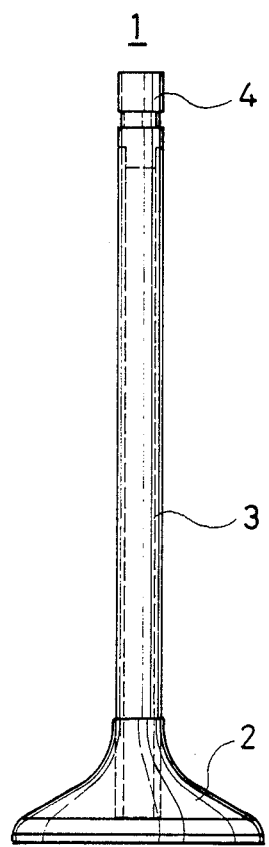
FIG. 1 is an overall view of one embodiment of a composite valve for internal combustion engines according to the present invention.

Referring first to FIG. 1, a valve 1 for internal combustion engines, which should hereinafter should be meant to refer to both an intake and an exhaust valve, comprises a head portion 2, a stem portion 3, and a stem end portion 4, each produced from a different material, formed into shape through separate manufacturing process, with some machining and other treatment operations being added as necessary, and integrated into a whole.

Figure 2:
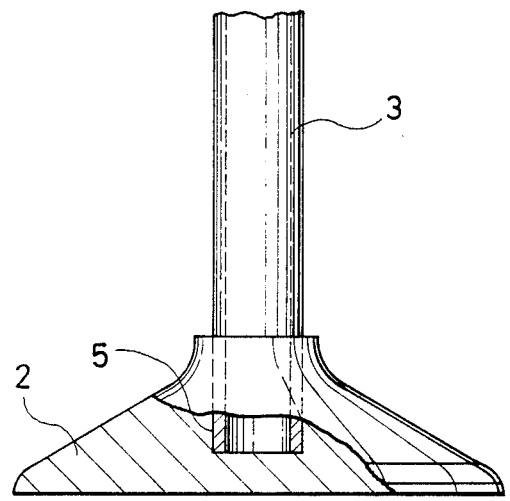
FIG. 2 is a cross-sectional view of the valve of this invention showing he joint between its head and stem portion.

The head portion 2 may, as can best shown in FIG. 2, be formed with a closed connection hole 5. The hole 5 is provided to fittingly receive therein a tail end of the stem portion 3. The fitting may be by any suitable conventional method such as shrinkage fit, cold fit, brazing, or other mechanical fitting in conjunction with or without one of two of these methods in combination.

The stem portion 3 is constructed hollow inside to reduce weight. A core portion 6 is inserted into the hollow of the stem portion 3 at its top end, which is firmly secured in position as the above.

The head portion 2 may preferably be produced from a lightweight, heat-resistant material such as titanium alloys or titanium aluminides. The stem portion 3 may preferably be made hollow, manufactured from a low alloy steel such as chromium-molybdenum steel or a titanium alloy, processed for abrasive resistance by Tufftride or molybdenum flame spraying. Also, the stem end portion 4 may preferably be produced from a very hard material such as martensitic steel or ceramics.

The foregoing titanium aluminides for the head portion 2 may be an intermetallic compound of titanium and aluminum such as TiAl and Ti$_3$Al, preferably with the mixture of one or more additives such as Ni, Nb, W, V, Mn, and B to enhance the good properties of the material. In more detail, the most desirable materials include, as TiAl, Ti-36Al and Ti-36Al-5Nb as well as, as Ti$_3$Al, Ti-16Al-10Nb and Ti-14Al-21Ni as well as (Figures being in percentage by weight).

To produce a valve head portion 2 according to the present invention, the mother material is produced from one of the above-mentioned materials by argon arc melting, plasma arc melting or vacuum arc remelting, and then is formed into shape by precision casting, isothermal forging, extrusion, hot isostatic press, with, if desired, suitable thermal treatment and machining work.

Among the foregoing titanium-aluminides for the head portion 2, Ti$_3$Al alloys provide increased formability while TiAl alloys being excellent in resistance to high temperatures. Thus, selection of materials by the valve designer may depend on the purpose for or operating condition under which his valve to be developed is intended.

Where both the head portion 2 and the stem portion 3 are manufactured from the same material of titanium alloy, a concrete example of this material may be Ti-6Al-2Sn-4Zr-2Mo.

When the head portion 2, the stem portion 3 and the stem end portion 4 of the intake or exhaust valves of an internal combustion engine are each produced, according to the present invention, from a different material that meets their particular requirements of operation, the production cost for the valve as a whole would be reduced, without reducing properties of the individual parts hence possibly correspondingly costing, properties, compared with conventional engine valves.

In addition, the valves can be manufactured in divided sections, the conventional employment of large forging machines is eliminated, with a resultant further reduction in production cost. Furthermore, the overall weight of the intake and exhaust valves thus produced can be smaller than, at least equal to that of conventional engine valves since their head portions 2 are made from a lightweight material with a low specific gravity such as titanium alloys or titanium aluminides, with the stem portions 3 being built in hollow structure.

Referring to then FIG. 4, the method for manufacturing a composite hollow valve for internal combustion engine will be described. The head portion 2 of the valve is formed in its center with a closed connection hole 5. A number of circumferential grooves 5a are cut in the inside wall of the hole 5, which is closed at its lower end by a bottom wall 5b.

The stem portion 3 has its lower end made larger in diameter than the rest of its body. The stem portion 3 is inserted into the hole 5.

With the stem portion 3 inserted into the hole 5 of the head portion 2, the joint is exposed to uniform heating by a high-frequency heating device 7. When the temperature of the joint is increased to a predetermined high level, pressurized inert gas is supplied from the opposite open end of the stem portion 3 through its hollow portion, so that the gas inside undergoes an instantaneous thermal expansion, causing the enlarged end of the stem portion 3 to expand outwardly against the inside wall of the hole 5 in the head 2 for rigid pressure fitting.

Then, a stem end portion, not shown, is fitted to the opposite end of the stem portion 3, and the assembled valve may be treated with the necessary steps of machining work and treatment to make it an intake or exhaust valve.

The method according to the present invention can shorten the production of composite valves for internal combustion engines since joining the components can be achieved in a short period of time. Also, the method can insure connection between the parts.

We claim:

1. A composite valve for internal combustion engines, comprising: a valve head having a center with a closed hole, said valve head being adapted to close and open a port of a cylinder head, a valve end adapted to receive linear thrust for valve operation, and a stem interconnecting said valve end with said valve head, said stem having an end fitted into said hole and another end secured to said valve end.

2. A composite valve as set forth in claim 1, wherein said head portion consists of a substantially lightweight, heat-resisting alloy material.

3. A composite valve as set forth in claim 1, wherein said valve end consists of a substantially hard material.

4. A composite valve as set forth in claim 1, wherein said stem has an axially hollow bore therein and consists of a high strength alloy material.

5. A composite valve as set forth in claim 1, wherein said head consists of a material selected from the group consisting of titanium alloys and titanium-aluminides.

6. A composite valve as set forth in claim 1, wherein said valve end consists of a material selected from the group consisting of martensitic stainless steel, silicon nitride, and silicon carbide ceramics.

7. A composite valve as set forth in claim 1, wherein said stem consists of a material selected from the group consisting of alloy steels, soft nitrided titanium alloys, and titanium alloys coated with molybdenum.

8. A method for manufacturing a composite valve for internal combustion engines, comprising the steps of:
providing a head portion, a stem portion with an axial hollow formed therein, and a stem end portion,
boring an axial closed hole in the center of said head portion,
forming a number of circumferential grooves in the inside wall of said hole,
connecting said stem portion with said head portion by inserting one end of said stem portion into said hole,
exposing said head portion with said end of said stem portion being held inserted into said hole to heating by heating means,
supplying pressurized inert gas from the opposite free end of said stem portion through said hollow, while said head portion is being heated, until said joined end of said stem portion swells outwardly in thermal expansion within said hole to provide a pressure fit therebetween, and
securing said stem end portion to said free opposite end of said stem portion.

* * * * *